United States Patent [19]
Abe

[11] Patent Number: 4,790,618
[45] Date of Patent: Dec. 13, 1988

[54] SEMICONDUCTOR LASER MODULE

[75] Inventor: Yuji Abe, Tokyo, Japan

[73] Assignee: NEC Corporation, Japan

[21] Appl. No.: 925,551

[22] Filed: Oct. 31, 1986

[30] Foreign Application Priority Data

Nov. 1, 1985 [JP] Japan ............... 60-16941319[U]

[51] Int. Cl.[4] .................................................. G02B 6/26
[52] U.S. Cl. ........................... 350/96.15; 350/96.18; 350/96.20
[58] Field of Search .............. 350/96.15, 96.18, 96.20

[56] References Cited

FOREIGN PATENT DOCUMENTS

| 38939 | 3/1977 | Japan | 350/96.15 |
|---|---|---|---|
| 47703 | 3/1977 | Japan | 350/96.15 |
| 19761 | 2/1979 | Japan | 350/96.15 |
| 55-15184 | 2/1980 | Japan . | |

OTHER PUBLICATIONS

Ulrich et al., "Beam-To-Fiber Coupling With Low Standing Wave Ratio," *Applied Optics*, vol. 19, No. 4 Jul. 15, 1980, pp. 2453–2456.

*Primary Examiner*—James B. Mullins
*Attorney, Agent, or Firm*—Leydig, Voit & Mayer

[57] ABSTRACT

The disclosure describes a semiconductor laser module having a semiconductor laser and an optical fiber for guiding a laser beam which issues from the semiconductor laser to become incident to the optical fiber, comprising an optical fiber, having an end face which is included 3° to 10° relative to a plane which is perpendicular to an axis of the optical fiber, a transparent optical member having a first end face which is intimately engaged with the end face of the optical fiber and a second end face which faces of the first end face and is perpendicular to the axis of the optical fiber, the optical member being substantially the same in refractive index as a core of the optical fiber and extending over a predetermined length along the axis of the optical fiber, and a reflection preventing film provided on the second end face of the optical member, whereby the laser beam is inclined to the reflection preventing film with an optical axis of the laser beam extending perpendicular to the second end face.

7 Claims, 3 Drawing Sheets

SEMICONDUCTOR LASER MODULE

BACKGROUND OF THE INVENTION

The present invention relates to a semiconductor laser module for introducing a beam of light issuing from a semiconductor laser into a single mode optical fiber.

An optical communication system which is implemented with an optical fiber includes an optical signal transmitting section in which a coherent beam of light emanating from a semiconductor laser (laser diode: LD) is modulated by a predetermined electric signal and, then, introduced into an optical fiber. In an LD module of the kind directing an output beam of an LD into a single mode optical fiber, the beam from an LD is condensed by a lens while an end face of an optical fiber is positioned in the vicinity of an imaging plane of the lens.

A problem heretofore pointed out in relation to such an arrangement is that a part of the beam which is reflected by the end face of the optical fiber is apt to be returned into the LD to render the wavelength spectrum of the LD unstable due to interference.

One prior art implementation for the reduction of the return of reflection is an LD module having a transparent sheet glass which is fixed in place on an end face of an optical fiber to which a beam from an LD is incident, that end of the sheet glass which receives the laser beam being inclined relative to a plane which is perpendicular to an axis of the optical fiber (see a paper entitled "Characteristics of LD Module for Single Mode Fiber 400 Mb/s", (in Japanese) Papers of National Meeting of the Institute of Electronics and Communication Engineers of Japan, pp. 8–360, published March 5, Show a 57 (1982)). Another prior art implementation is an LD module in which that end face of an optical fiber which receives a beam from an LD is inclined itself relative to a plane which is perpendicular to an axis of the optical fiber. While both of such prior art LD modules allow the beam from the LD to be focused on the end face of the optical fiber, they bring about a decrease in the coupling efficiency of the LD and the optical fiber since the sheet glass or the fiber end itself is inclined as stated above. The sheet glass type scheme has another disadvantage that the beam from the LD reaches the optical fiber after being refracted by the inclined end of the sheet glass, further aggravating the coupling efficiency.

SUMMARY OF THE INVENTION

It is an object of the present invention to provide an LD module which introduces a beam from an LD into an optical fiber with efficiency.

It is another object of the present invention to provide an LD module which sufficiently attenuates light as is returned due to reflection.

In accordance with the present invention, there is provided a semiconductor laser module having a semiconductor laser and an optical fiber for guiding a laser beam which issues from the semiconductor laser to become incident to the optical fiber, comprising an optical fiber having an end face which is inclined 3° to 10° relative to a plane which is perpendicular to an axis of the optical fiber, a transparent optical member having a first end face which is intimately engaged with the end face of the optical fiber and a second end face which faces of the first end face and is perpendicular to the axis of the optical fiber, the optical member being substantially the same in refractive index as a core of the optical fiber and extending over a predetermined length along the axis of the optical fiber, and a reflection preventing film provided on the second end face of the optical member, whereby the laser beam is inclined to the reflection preventing film with an optical axis of the laser beam extending perpendicular to the second end face.

BRIEF DESCRIPTION OF THE DRAWINGS

The above and other objects, features and advantages of the present invention will become more apparent from the following detailed description taken in conjunction with the accompanying drawings in which.

DETAILED DESCRIPTION OF THE EMBODIMENT

A preferred embodiment of the present invention will be described in detail with reference to the accompanying drawings.

To facilitate an understanding of the present invention, a brief reference will be made to prior art structures elaborated to prevent reflected light or reflection from being returned.

Figure 1:
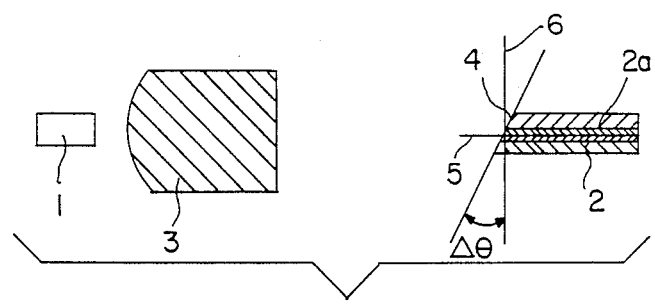
FIG. 1 is a fragmentary vertical section of a prior art semiconductor laser module.

Referring to FIG. 1, there is shown a prior art LD module which is constructed and arranged to introduce a beam of light issuing from a semiconductor laser (LD) 1 into a core 2a of a single mode optical fiber 2 which is made of quartz.

Figure 3:
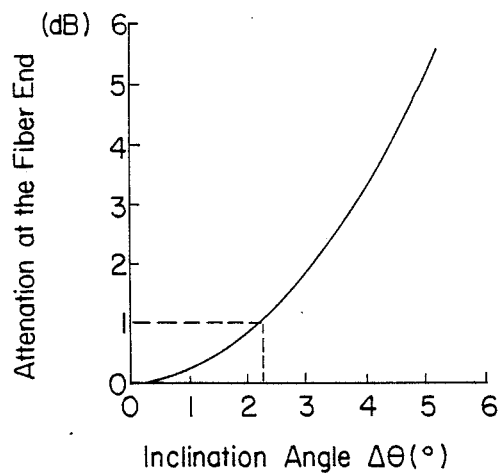
FIG. 3 is a graph representative of a relationship between amounts of deterioration of power input to a single mode optical fiber and inclination angles of an end face of the optical fiber.

In FIG. 1, the beam issuing from the LD 1 travels through a lens 3 and, then, becomes incident to the core 2a of the optical fiber 2 which has an end face 4 located in the vicinity of an imaging plane of the lens 3. The end face 4 of the fiber 2 is inclined an angle of $\Delta\theta$ relative to a plane 6 which is perpendicular to an axis 5 of the fiber 2, so that a return of reflection is eliminated. A problem with this LD module is that the amount of deterioration of power input to the fiber 2 due to the inclination angle $\Delta\theta$ of the fiber end face 4 is substantial, as shown in FIG. 3. For the inclination angle $\Delta\theta$ of 2.3°, for example, the input power is deteriorated by 1 dB. Such a degree of deterioration makes it impracticable for a beam issuing from the LD 1 to be introduced into the single mode fiber 2 with efficiency.

Figure 2:
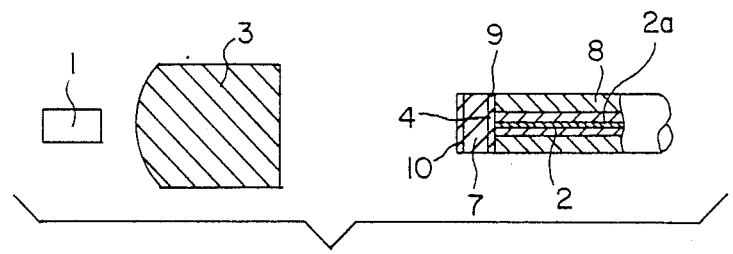
FIG. 2 is a view similar to FIG. 1, showing another prior art semiconductor laser module.

FIG. 2 shows another prior art LD module proposed to solve the problem as discussed above. As shown, the LD module includes a hollow cylindrical reinforcing tube 8 in which an end portion of the optical fiber 2 is inserted, and a transparent cap 7 which is fixed by a transparent adhesive 9 to the fiber end face 4 after the fiber end 4 has been polished. The cap 7 is made of glass whose refractive index is close to that of quartz so as to suppress reflection at the interface between the cap 7 and the optical fiber 2. Further, a reflection preventing or anti-reflection film 10 is provided on that end face of the cap 7 which faces the lens 3, thereby reducing influence of reflection which occurs on that end face. The imaging plane of the lens 3 is positioned on the end face 4 of the fiber 2. In this construction, a part of the light issuing from the LD is reflected by the fiber end face 4, i.e., the fiber end 4 serves as a reflection surface. It is known that an amount of attenuation $R_T$(dB) of reflection which is returned from the reflection surface 4 to the LD is produced by:

$$R_T(dB) = C(dB) + R(dB) + 2\alpha(dB) \quad \text{Eq. (1)}$$

where C denotes a loss occurring when the light returned enters the LD, R an amount of attenuation by reflection occurring on the reflection surface, and $\alpha$ a loss due to propagation through the lens.

Figure 4:
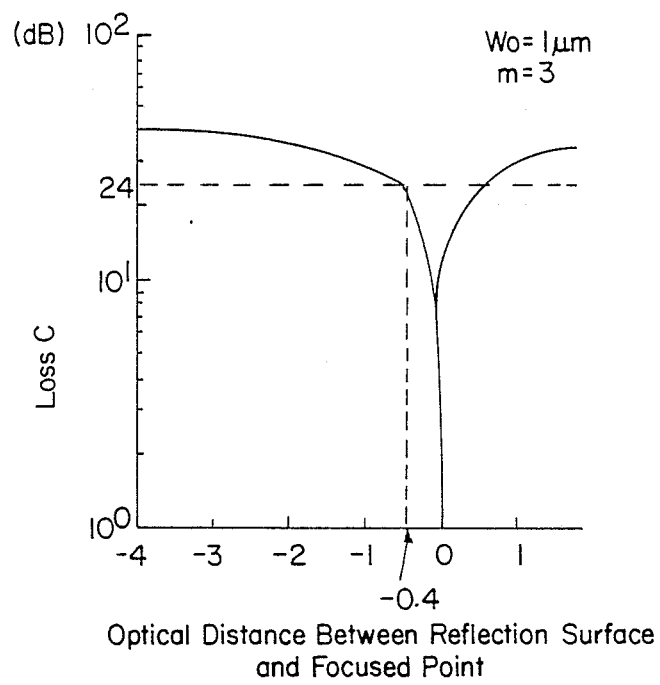
FIG. 4 is a graph showing amounts of attenuation of reflection which is returned to a semiconductor laser, relative to a relative distance of a reflection surface.

Referring to FIG. 4, a relationship between a reflection surface relative distance and the loss C is shown. The words "reflection surface relative distance" mentioned implies the optical distance between the reflection surface and the imaging position of the LD; the relative distance is assumed to be "positive" when the imaging position of the lens 3 is located at the LD side with respect to the reflection surface and "negative" when it is located at the optical fiber side with respect to the same. It is to be noted that the graph of FIG. 4, using Gaussian beam approximation, shows a variation of the coupling loss C when the spot size $W_0$ of the LD is assumed to be 1 μm and the magnifying power m of the lens 3, 3. Where the reflection surface, i.e., the end face 4 of the optical fiber 2, is aligned with the imaging plane of the lens, as has been the case with the LD module of FIG. 2, the reflection surface relative distance is substantially zero and, therefore, the loss C is almost zero.

Assuming that the refractive index of the core 2a of the optical fiber 2 is 1.46 and that of the transparent adhesive 9 is 1.52, then the amount of attenuator R is 33 dB. Then, assuming that the loss $\alpha$ is 4 dB, the amount of attenuation $R_T$ of the returned reflection is 41 dB as produced by the Eq. (1).

However, the amount of attenuation $R_T$ should preferably be greater than 50 dB. This is because should the reflection not be attenuated beyond 50 dB, the wavelength spectrum of the LD 1 would become unstable and, therefore, the transmission characteristics would be degraded due to wavelength dispersion of the single mode quartz fiber 2. Thus, as regards the LD module of FIG. 2, it is difficult for the wavelength spectrum of the LD to be stabilized to a sufficient degree.

Figure 5:
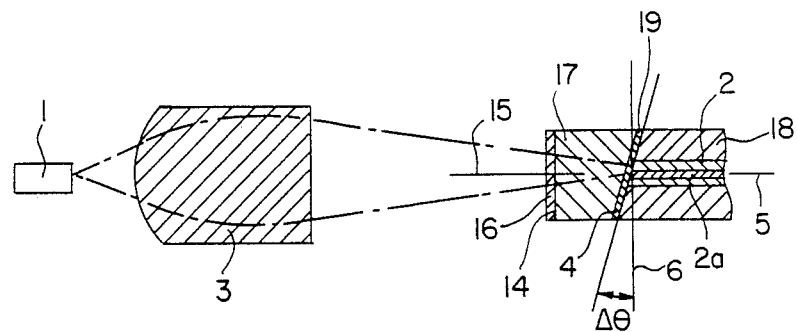
FIG. 5 is a schematic section representative of a basic principle of a semiconductor laser (LD) module in accordance with the present invention.

Referring to FIG. 5, the basic arrangement of an LD module in accordance with the present invention is shown in a vertical section. In FIG. 5, the same or similar structural elements as those shown in FIG. 2 are designated by like reference numerals. An LD 1 and a lens 3 of FIG. 5 are identical with those shown in FIG. 2. An end portion of a single mode quartz optical fiber 2 is received in a hollow cylindrical reinforcing tube 18. The end face 4 of the optical fiber 2 is polished to be inclined an angle of $\Delta\theta$ relative to a plane 6 which is perpendicular to an axis 5 of the optical fiber 2. The angle of inclination $\Delta\theta$ should be such that light reflected by the end face 4 is prevented from returning to the LD 1, and such that considering the reflectivity of the end face 4 the amount of deterioration of input power to the optical fiber 2 is confined to an allowable range (smaller than 0.1 dB). For these reasons, the angle $\Delta\theta$ has to be 3° at minimum and should preferably not exceed 10°.

A transparent cap 17 is fixed to the whole end face 4 of the optical fiber 2 by a transparent adhesive 19 which has a uniform thickness. An axis of he cap 17 is in line with that of the optical fiber 2. Both the cap 17 and the adhesive 19 are made of materials whose refractive indices are greater than 1.4 and smaller than 1.8.

Because the refractive index of the core of the single mode fiber 2 is on the order of 1.46, the transparent cap 17 may be made of, for example, quartz glass. The transparent adhesive 19, on the other hand, may comprise epoxy resin which is extensively used for optical applications.

As stated above, the refractive indices of the cap 17 and adhesive 19 are both selected to reduce the reflectivity on the end face 4 of the optical fiber 2 and, thereby, confine the deterioration of input power to less than a predetermined value. For example, the adhesive 19 made of epoxy resin has a refractive index of 1.52 which is 0.06 greater than that of the optical fiber 2, i.e. 1.52−1.46=0.06. It follows that even if the angle $\Delta\theta$ is selected to be 10°, the amount of deterioration of the input power can be maintained smaller than 0.1 dB.

Meanwhile, an end face 14 of the cap 17 which faces the lens 3 lies in a plane which is perpendicular to the axis 15 of the cap 17. A reflection preventing or anti-reflection film 16 whose reflectivity is smaller than 1% is provided on the end face 14 of the cap 17.

Now, the amount of attenuation of reflection on the end face 14 of the cap 17 will be calculated. Assume that the anti-reflection film 16 comprises a single-layer alumina film or a multi-layer dielectric film deposited by evaporation and has a reflectivity of 1%. Then, the amount of attenuation R on the reflection surface 14 is 20 dB ($=-10 \log 10^{31\ 2}$). Further, assume that the amount of attenuation $\alpha$ of light which is transmitted through the lens is 3 dB, the worst value. In this instance, if $R_T$ of the previously presented Eq. (1) is greater than 50 dB, it is possible to stabilize the output light of the LD and, therefore, the loss C of light which is returned to the LD 1 need only be greater than 24 dB.

Referring to the graph of FIG. 4, in order that the loss C may be greater than 24 dB, the distance between the imaging plane of the lens (substantially aligned with the end face 4 of the optical fiber 2) and the end face 14 of the cap 17 has to be greater than 0.4 mm in terms of optical length.

The above requirement is met only if the thickness of the cap 17 in along the axis 15 of the cap 17 is selected to be greater than 0.4 mm in terms of optical length, i.e. 0.4× (refractive index of cap) (mm) or more.

Hence, the reflection on the end face 14 of the cap 17 is sufficiently attenuated to render the emission from LD 1 stable.

The magnification m=3 of the lens 3 is the lower limit available in relation to the use of a single mode quartz optical fiber, i.e., magnifications smaller than 3 would bring about losses of input power. As the magnification m increases beyond 3, the reflection surface relative distance in accordance with the characteristic of FIG. 4 widens sideways apart from the position of 0 (mm). As a result, the absolute value of the above-mentioned relative distance which is necessary for C=24 (dB) to be achieved increases with the magnification m. Further, when the reflectivity of the anti-reflection film 16 is smaller than 1%, the amount of attenuation R on the reflection surface 14 becomes greater than 20 dB. In this case, because the loss C need only be smaller than 24 dB, a thickness of the cap 14 along the axis 15 which is smaller than 0.4 mm suffices.

Figure 6:
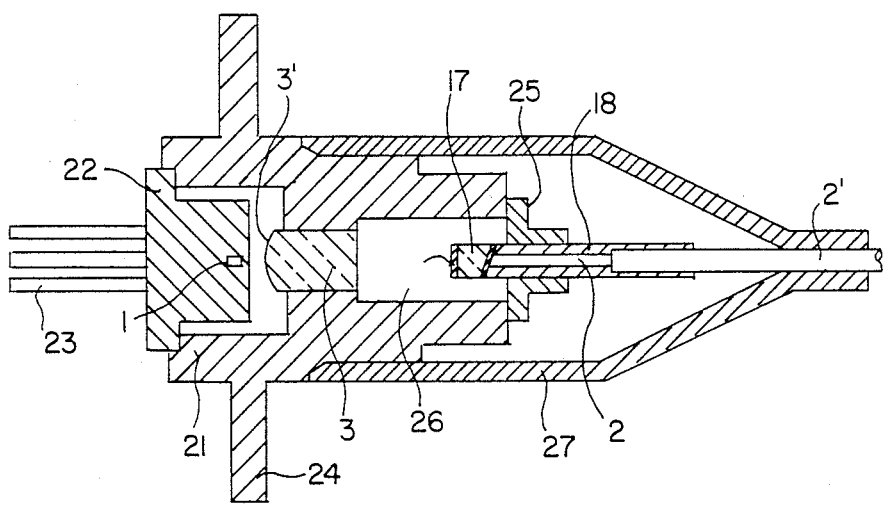
FIG. 6 is a section of a semiconductor laser module which is implemented with the principle of FIG. 5.

Referring to FIG. 6, an LD module to which the principle of the present invention as depicted in FIG. 5 is applied is shown. It is to be noted that all the structural elements of FIG. 6 have circular inner and outer peripheries as viewed in sections which are perpendicular to the optical axes thereof.

In FIG. 6, the LD module includes a metallic holder 21, and a package 22 which is securely mounted on the left end of the holder 21. The package 22 accommodates the LD 1 therein. Electrodes 23 are provided on the package 22 to feed an electric signal to the LD 1. A flange 24 extends radially outwardly from the holder 21 so that the holder 21 may be mounted to a panel of an apparatus or the like.

The lens 3 is rigidly mounted in a radially central portion of the holder 21 with a spherical surface 3' thereof facing the LD 1.

A right portion of the holder 21 is reduced in diameter stepwise. A sleeve 25 is coupled in the extreme end of the reduced diameter portion of the holder 21. A bore, no numeral, extends throughout the sleeve 25 along the axis of the latter while the single mode quartz optical fiber 2 is rigidly received in the through bore. A nylon jacket 2' which covers the optical fiber 2 is removed at an end portion thereof. The whole uncovered end portion of the optical fiber 2 as well as a part of the jacket 2' are surrounded by a reinforcing tube 18 and firmly held thereby with the intermediary of an adhesive and others. The specific constructions of the cap 17 and others are exactly the same as those which have been described with reference to FIG. 5. A portion of the fiber 2 adjacent to the end face and the cap 17 are fixed in place in a bore 26 which is formed in the holder 21 at the right-hand side of a portion of the holder 21 where the lens 3 is supported. A cover 27 which is made of polyvinylchloride resin is adapted to prevent water from entering the LD module and to reinforce the optical fiber 2 against bending forces.

In accordance with this particular embodiment, the reflectivity of the anti-reflection film 16 is selected to be 1%, the inclination angle of the interface between the cap 17 and the optical fiber 2 is selected to be 8°, the refractive index and the thickness of the cap 17 are selected to be 1.5 and 1.2 mm, respectively, and the refractive index of the adhesive 19 is selected to be 1.52. Experiments showed that an LD module with such specific numerical values causes the LD 1 to lase with considerable stability.

The LD module in accordance with the present invention is not limited to the particular embodiment shown and described. While in the embodiment the lens is implemented with a single rod lens, it may be replaced with a spherical lens, a confocal lens, etc. Further, the mechanism adapted to fix a lens and an optical fiber on a beam output side may be replaced with any one of various parts which are used with optical fiber connectors as well known in the art.

In summary, it will be seen that the present invention provides an LD module in which an end face of a single mode quartz optical fiber is inclined to eliminate return of reflection therefrom and, in addition, reflection from that end face of a transparent cap which faces a lens is sufficiently attenuated. Such an LD module successfully stabilizes a beam of light which issues from an LD and, yet, allows a minimum of deterioration of input power to the optical fiber to occur.

What is claimed is:

1. A semiconductor laser module having a semiconductor laser comprising:
    an optical fiber for guiding a laser beam which issues from the semiconductor laser, said optical fiber having a core and an end face which is inclined 3° to 10° relative to a plane which is perpendicular to an axis of said optical fiber;
    a transparent optical member having a first end face which is intimately engaged with said end face of said optical fiber and a second end face which faces said first end face and is perpendicular to said axis to said optical fiber, the end face of said optical fiber and the first end face of said optical member being rigidly connected by a transparent adhesive having substantially the same refractive index as the core of said optical fiber and said optical member having substantially the same refractive index as the core of said optical fiber and extending over a predetermined length along said axis of said optical fiber;
    a reflection preventing film provided on said second end face of said optical member whereby said laser beam is incident to said reflection preventing film with an optical axis of said laser beam extending perpendicular to said second end face; and
    a lens interposed between said semiconductor laser and said optical member for conducting said laser beam from said semiconductor laser into said core of said optical fiber.

2. A semiconductor laser module comprising:
    a housing;
    a semiconductor laser package rigidly mounted on one end of said housing and including a semiconductor laser;
    an optical fiber terminal rigidly mounted on the other end of said housing and including an optical fiber for guiding a laser beam which issues from the semiconductor laser, the optical fiber having a core and an end face which is inclined 3° to 10° relative to a plane which is perpendicular to an axis of said optical fiber, a transparent optical member having a first end face intimately engaged with said end face of said optical fiber and a second end face which faces said first end face and is perpendicular to said axis to said optical fiber, said optical member having substantially the same refractive index as the core of said optical fiber and extending over a predetermined length along said axis of said optical fiber, and a reflection preventing film provided on said second end face of said optical member; and
    a lens fixed in place at substantially the center of said housing for conducting said laser beam from said semiconductor laser into said optical fiber;
    whereby said laser beam is incident to said reflection preventing film with an axis of said laser beam extending perpendicular to said second end face.

3. A fiber optic module comprising:
    a housing;
    an optical fiber supported by the housing and including a core having an axis and an end face which is inclined relative to the axis, the angle of inclination being in the range from about 3° to about 10°;
    a transparent member coaxially disposed at the end face of the optical fiber and including first and second end faces, the first end face of the transparent member being joined to the end face of the optical fiber, the second end face of the transparent member lying perpendicular to the axis of the optical fiber, and the refractive index of the transparent member being substantially the same as the refractive index of the core of the optical fiber;

means supported by the housing for generating a laser beam;

lens means supported by the housing between the laser generating means and the transparent member for directing the laser beam into the optical fiber; and means provided on the second face of the transparent member for reducing reflection of the laser beam, wherein the optical length of the transparent member is a predetermined value by which the sum of the attenuation of reflection occurring at the reflection reducing means, the loss due to propagation through the lens means, and the loss occurring when the light returned enters the laser generating means is at least 50 dB.

4. The fiber optic module of claim 3 wherein the laser generating means comprises a semiconductor laser.

5. The fiber optic module of claim 3 wherein the lens means consists essentially of a single lens having a magnification of at least 3.

6. The fiber optic module of claim 3 wherein the reflection reducing means comprises a reflection preventing film.

7. The fiber optic module of claim 3 wherein the first end face of the transparent member is joined to the end face of the optical fiber by a transparent adhesive.

* * * * *